June 13, 1933.  A. J. DEXTER  1,913,374
COLLAPSIBLE CHUCK AND TIRE FORMER
Filed July 6, 1931    4 Sheets-Sheet 1

INVENTOR.
BY ALBERT J. DEXTER
Chapin + Neal
ATTORNEYS.

June 13, 1933. A. J. DEXTER 1,913,374
COLLAPSIBLE CHUCK AND TIRE FORMER
Filed July 6, 1931 4 Sheets-Sheet 2

INVENTOR.
BY ALBERT J. DEXTER
Chapin & Neal
ATTORNEYS.

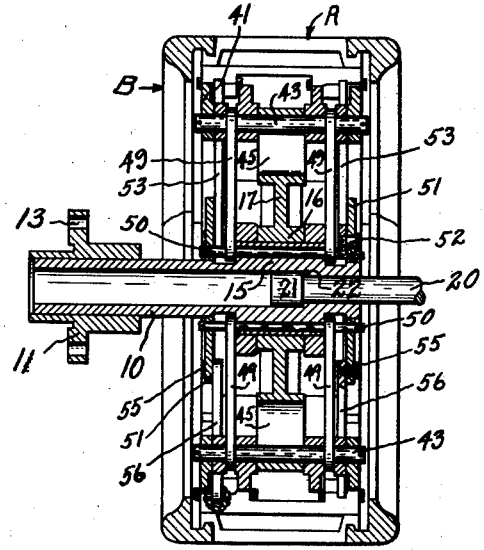

June 13, 1933.  A. J. DEXTER  1,913,374
COLLAPSIBLE CHUCK AND TIRE FORMER
Filed July 6, 1931   4 Sheets-Sheet 4

INVENTOR.
BY ALBERT J. DEXTER
Chapin & Neal
ATTORNEYS.

Patented June 13, 1933

1,913,374

UNITED STATES PATENT OFFICE

ALBERT J. DEXTER, OF SPRINGFIELD, MASSACHUSETTS, ASSIGNOR TO ROLAND W. BOYDEN AND CHARLES A. DANA, RECEIVERS FOR THE FISK RUBBER COMPANY, OF CHICOPEE FALLS, MASSACHUSETTS, A CORPORATION OF MASSACHUSETTS

COLLAPSIBLE CHUCK AND TIRE FORMER

Application filed July 6, 1931. Serial No. 548,804.

This invention relates to drums upon which pneumatic tire casings are built, of the type having means for collapsing the drum for the removal of the casing. More particularly it relates to a device of this character for constructing the tire in semi-flat form.

In general the object of the invention is the provision of a drum and chuck adapted for the construction of tires having a relatively large cross-section and relative small bead diameter. Chucks now commonly in use do not collapse to a degree sufficient to permit the removal of casings having small bead diameters, it being necessary for removal of the completed tire that the degree of collapse be such as to bring the outer circumference of the drum substantially within the bead diameter of the tire and the difficulty of accomplishing this is increased where the tire is of large cross-section and is built semi-flat since the building drum must be very wide and the space within which the collapsing mechanism must be accommodated is very small. Among the more specific objects of my invention is an arrangement of the drum members so as to permit of a greater degree of collapse of the members and the provision of simplified collapsing mechanism of relatively few parts capable of being assembled within the limits of a bead annulus of a diameter of the order of 16 inches. A further feature of the invention is found in the arrangement of the shoulder and bead supporting portions of the drum as separable elements. Other and further objects and advantages of the invention will be apparent from the following specification and claims.

In the accompanying drawings which illustrate one embodiment of the invention,

Fig. 5 is a horizontal sectional view taken substantially on line 5 of Fig. 2, certain links and supporting mechanism being broken away;

Fig. 6 is a side elevation view taken on line 6—6 of Fig. 4 but showing the position of the parts after the segmental sections fixed in the operating plane have been collapsed to permit the removal of the tire and detachable shoulder rings;

Figure 3:
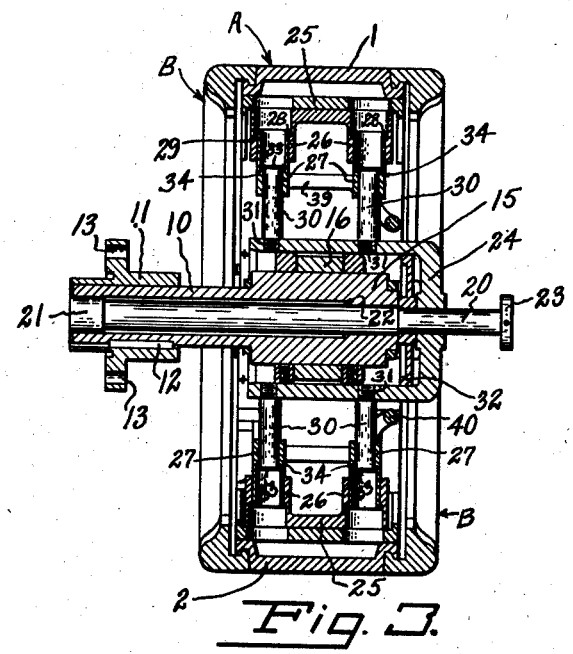
Fig. 3 is a vertical sectional view taken through the former and support substantially on line 3—3 in Fig. 1.

As best shown in Fig. 3, the tire drum comprises a central substantially flat portion A and shoulder rings B. These shoulder rings shape not only the beads of the tire but also those portions of the tire adjacent the beads which are built in curved form.

As will be more fully described later, the shoulder rings B are provided with inwardly projecting key flanges which fit in grooves formed in edges of the central portion A, permitting the latter to be collapsed to leave the shoulder rings free in the tire casing. This arrangement permits the substitution of shoulder rings of varying width, depth and shape and makes it possible to use the chuck for a range of different tire sizes and constructions.

Figure 1:
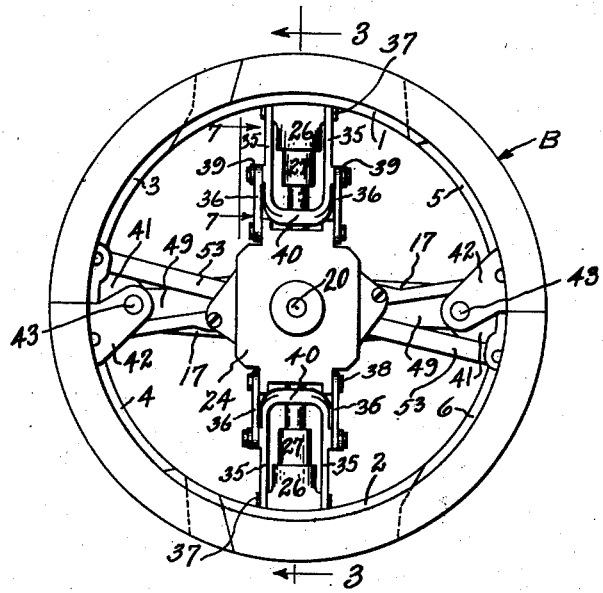
Fig. 1 shows a side elevation of the segmental former and supporting chuck with the parts in operative continuity.
Figure 2:
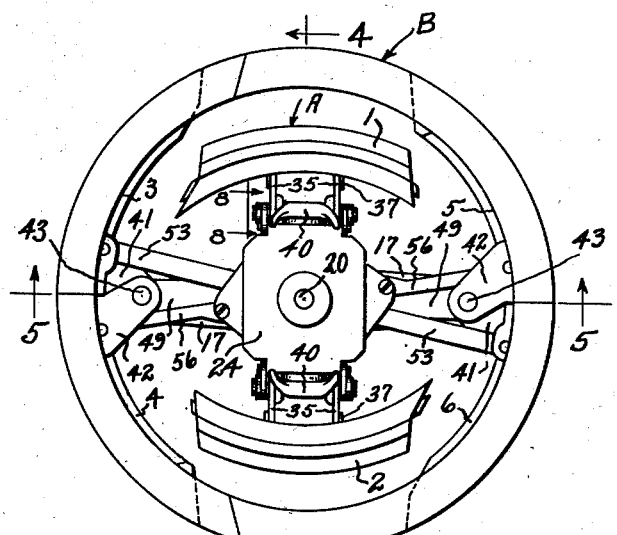
Fig. 2 is a view similar to Fig. 1 showing the key sections in the position which they will occupy after they have been removed from the tire.

As best shown in Figs. 1, 2 and 6, the central drum portion is divided into six sections, two diametrically opposite key sections 1 and 2 and four sections 3, 4, 5 and 6, the latter being hinged in pairs as later more fully described.

Referring to Figs. 3 and 5, the chuck is carried by a hollow shaft 10 to one end of which is secured a flanged collar 11, as by a key 12. This flanged collar is provided with bolt holes 13 by which the shaft 10 may be rigidly secured to the rotatable shaft of the tire building machine. The other end of shaft 10 is provided with an enlargement 15 upon which is rotatably mounted a hub 16 formed with diametrically opposite arms 17 to which the drum sections 3, 4, 5 and 6 are pivoted.

Figure 4:
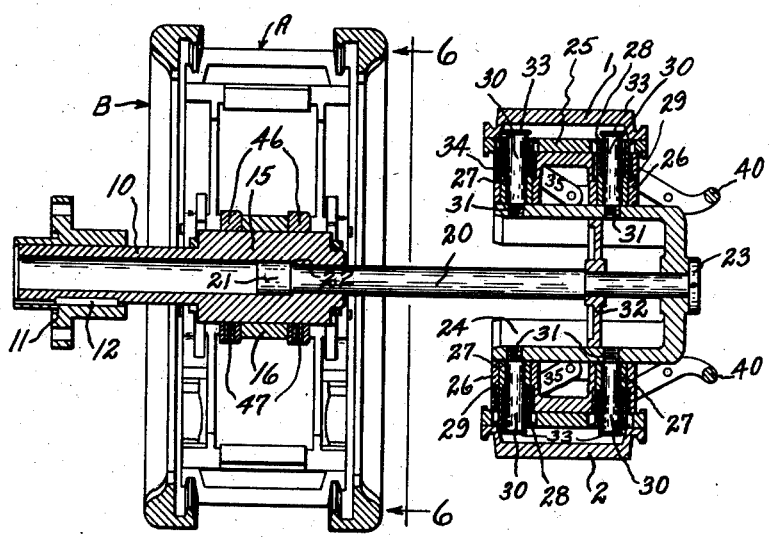
Fig. 4 is a vertical sectional view taken substantially on line 4—4 of Fig. 2.

Telescoped within the hollow shaft 10 is a shaft 20 provided with a head 21 adapted when shaft 20 is in outwardly extended position, as shown in Fig. 4, to engage a shoulder 22 formed in the shaft 10.

Figure 7:
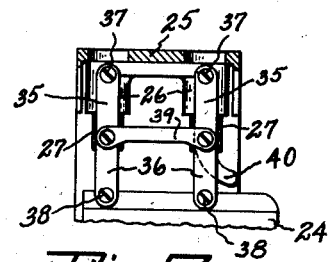
Fig. 7 is a detail elevation of the linkage for the key sections, see line 7—7 of Fig. 1.
Figure 8:
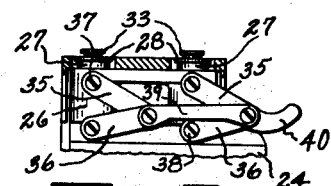
Fig. 8 is a detail elevation of the linkage for the key sections showing the linkage in the position it will occupy when in its collapsed position, see line 8—8 of Fig. 2.

The key sections 1 and 2 of the former are carried by a U-shaped member 24 slidably mounted on shaft 20, the arms of the U being adapted to telescope over the hub 16 between arms 17, as shown in Figs. 1 and 3, when the chuck and former sections are in assembled or "set up" relation. The key sections 1 and 2 are respectively secured to members 25 provided with cylindrical bosses 26 in which are telescoped sleeves 27 having flanges 28 adapted to limit the extension of the sleeves by engagement with shoulders 29 formed in the bosses. The sleeves 27 are telescopically mounted on pins 30 threaded as at 31 in the arms of member 24. The pins 30 are provided with heads 33 adapted to engage shoulders 34, formed on the interior of sleeves 27, to limit the outward movement of the sleeves on the pins. As will be clear from Figs. 3 and 4, key sections 1 and 2 are adapted to be collapsed from the position of Fig. 3 to that of Fig. 4 by the telescoping of sleeves 27 into the bosses 26 and pins 30 into the sleeves 27. This telescoping movement of the bosses, sleeves and pins is accomplished, as best shown in Figs. 7 and 8, by parallel toggle links 35 and 36, pivoted at 37 to the members 25 and at 38 to the member 24, the knees of the toggles being connected, for common movement, by links 39. As shown in Figs. 1 and 2, this toggle linkage is duplicated on each side of the members 25 and the outer links 35 are joined to form operating handles 40.

Upon collapse of the key members 1 and 2 through the linkage just described the U-member 24 may be drawn outwardly from the operative plane of the chuck, as shown in Fig. 4, this outward movement being effected partly by movement of member 24 along shaft 20 until it engages head 23 of the shaft and thereafter by the outward movement of shaft 20 until head 21 engages shoulder 22.

Fixed to the shaft 20 is a disk 32 which acts as a bearing for the U-shaped member 24 when the latter is in its outward position as shown in Fig. 4. The complete displacement of the key sections, together with their supporting and collapsing mechanism, from the operative plane of the drum, provides increased room in which the remaining sections may be collapsed.

Referring to Figs. 1, 2, 5 and 6, drum sections 3 and 4 are shown as pivoted by means of lugs 41 and 42, respectively, to a common pivot rod 43. Sections 5 and 6 are similarly pivoted to a similar rod 43 and since the linkage and mounting of each pair of sections is identical the same reference characters are used for each and the following description is applicable to each.

The pivot rods 43 are mounted for radial movement in slots 45 formed in arms 17 which, as previously mentioned, are formed on the hub 16 which is rotatably mounted on shaft 10. The hub 16 is held in position longitudinally of the shaft 10 by collars 46 held to the shaft by set screws 47 (see Fig. 4). The pivot rods 43 are connected by links 49 to rods 50 held in the enlarged portion 15 of shaft 10. Rods 50 also serve to secure plates 51 to shaft 10. The drum sections 3 and 6 are respectively connected as at 52 to plates 51 by links 53 while sections 4 and 5 are connected to said plates at 55 by links 56. As is clearly shown in Fig. 6, the points of connection 52 of links 53 are nearer the center of rotation of shaft 10 than are points 55 at which links 56 are attached and links 53 are longer than links 56. Assuming that the key sections 1 and 2 with their associated parts have been collapsed and removed from the operative plane of the drum, the remaining sections and associated linkage will be in the position shown in Figs. 2 and 5, the gap left by the key sections being bridged by the shoulder rings B and the tire casing, not shown. In collapsing these hinged sections, the shaft 10, and therefore enlargement 15 and plates 51, are held stationary, as by the application of the brake of the tire building machine. The operator grasps one of the sections 3, 4, 5 or 6 and imparts a rotary motion, clockwise as viewed in Fig. 2, to the sections. Since the inner ends of links 49, 53 and 56 are held stationary this relative movement imparted to the sections draws the pivot rods 43 inwardly of slots 45 and simultaneously swings the sections inwardly about their pivots 43. The relative lengths of the various links and the relative positions of their points of attachment to the stationary shaft 10, as above mentioned, cause the sections to fold in overlapped or interleaved relation as their respective pivots are simultaneously moved toward each other, bringing the parts to the position shown in Fig. 6. The tire, with the shoulder rings B therein, may then be easily slipped from the completely collapsed drum.

Figures 15, 16:
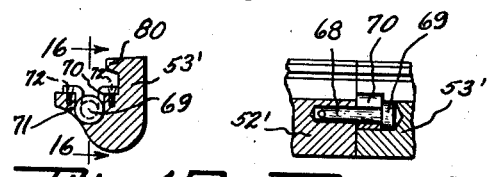
Fig. 15 is a detail of the locking pin taken on line 15—15 of Fig. 10.
Fig. 16 is a section taken on line 16—16 of Fig. 15.

The shoulder rings B, see Figs. 9 to 16, inclusive, are each formed in four sections, 50′, 51′, 52′ and 53′. Sections 50′ and 51′ are axially pivoted together, to permit of their being twisted out of the plane of the ring, by means of a bearing 55′ secured by machine screws 56′ in an open-sided recess 57 formed adjacent one end of section 50′. Bearing 55′ is spaced from the closed end of recess 57 to provide for the head 58 of a pin 59, pinned as at 60 in a recess 61 formed in the adjacent end of section 51′. Sections 52′ and 53′ are hinged respectively to the free ends of sections 51′ and 50′ by links 63 rigidly secured to the respective sections 52′ and 53′ as by pins 64 and pivotally secured at 65 in ends of slots 66 formed in the ends of sections 51′ and 50′. The free end of each section 52′ is provided with a pin 68 having a head 69. The free end of each section 53′ is provided with a U-shaped member 70 secured by means of machine screws 72 in an open sided recess 71, formed in the end of the section. Member 70 is spaced from the closed end of recess 71 as shown in Fig. 16 sufficiently to accommodate head 69 of pin 68, the shank of the pin being received in the arms of member 70, when the sections are in annular continuity.

The sections of the shoulder rings B are provided with radially inwardly extending flanges 80 fitting in complementary recesses 81 formed adjacent the edges of sections of the central portion B of the former, when the latter are in operative continuity.

Figure 9:
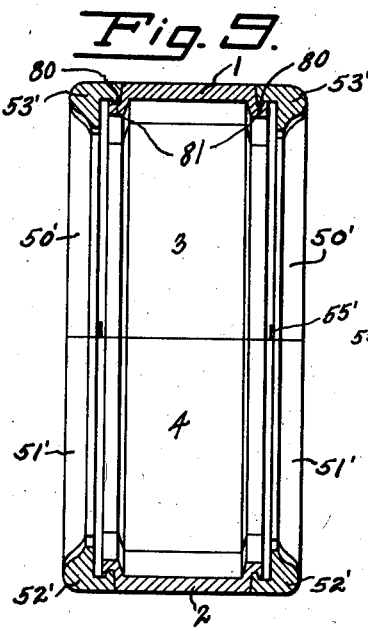
Fig. 9 is a vertical sectional view of the segmental building core and detachable shoulder rings.
Figure 10:
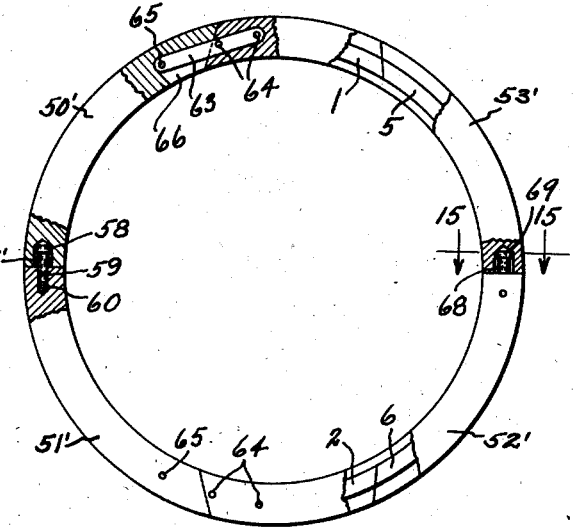
Fig. 10 is a side elevation of the parts shown in Fig. 9, portions thereof having been broken away to show the constructions to better advantage.
Figures 11, 13, 14:
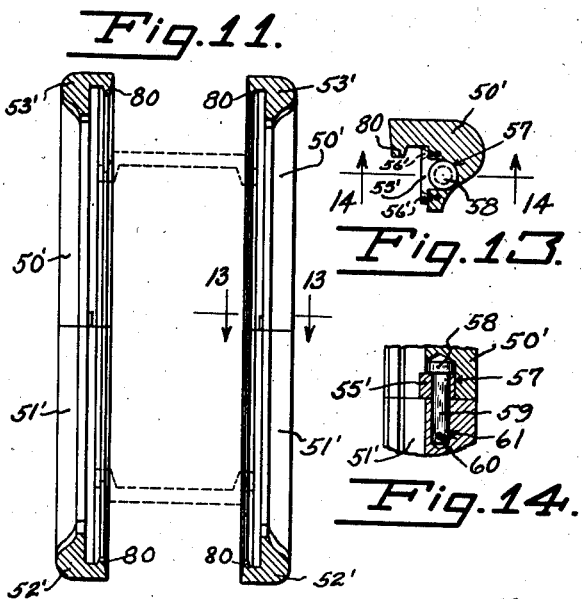
Fig. 11 is a sectional view similar to Fig. 9, the movement of the former sections being indicated by dotted lines.
Fig. 13 is a detail of the shoulder ring, pivot pin and bearing taken on line 13—13 of Fig. 11.
Fig. 14 is a section on line 14—14 of Fig. 13.
Figure 12:
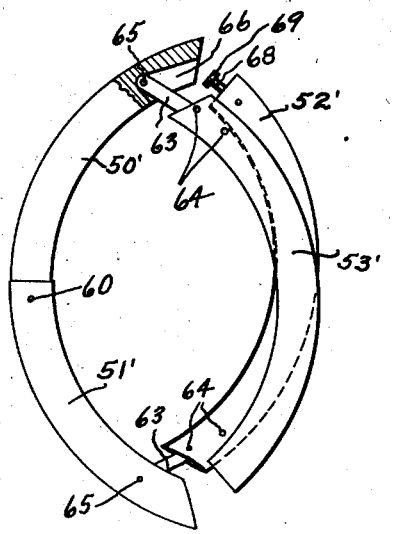
Fig. 12 illustrates in elevation the collapsing and pivoting of one of the segmental shoulder rings when collapsed to permit removal of the ring from the tire casing.

The operation may be summarized as follows:

Assuming the parts to be in the position shown in Figs. 1, 3 and 9, and that a tire casing, built on the drum, is to be removed, the key sections 1 and 2 are first collapsed radially as shown in Fig. 4 and in dotted lines in Fig. 11, after which they are drawn axially to the position shown in Fig. 4. The sections 3, 4, 5 and 6 are then collapsed, as previously described, permitting rings B and the tire thereon to drop as shown in Fig. 6. Flanges 80 are now, of course, free of recesses 81, except where the rings rest on the collapsed sections, and the tire with rings B can be slipped axially from the collapsed drum. To remove the rings B, sections 51′ and 52′ are twisted, within the casing, out of the plane of continuity with sections 50′–53′, pin 68 swinging free of U-shaped member 70 after which sections 52′ and 53′ are collapsed as shown in Fig. 12 permitting easy removal of the rings from the casing.

The separation of the drum into the parts A and B in addition to adapting the chuck and portion A to a range of sizes and constructions, also makes it possible to build tires of relatively small bead diameter on shouldered drums and remove the tire without undue distortion, since the shoulder portions of the drum are now drawn radially past the beads through a direct radial collapse of the shoulder portion of the drum. Where the tire construction desired or the building methods used do not entail the above difficulties the shoulders may be made integral with the center portion of the drum.

Having thus described my invention, I claim:

1. In a collapsible annular tire building drum, a pair of diametrically opposed key sections, and two diametrically opposed hinged pairs of sections to complete the drum annulus, means to collapse the key sections diametrically toward each other, said key sections, when in collapsing position, together with their collapsing means, being movable axially from the plane of the drum annulus, and means operable after removal of the collapsed key sections from said plane to move the hinged pairs of sections bodily toward each other and means to simultaneously swing the sections of each pair inwardly about their hinges to complete the collapse of the drum.

2. In a collapsible annular tire building drum, a supporting shaft therefor, a pair of diametrically opposed key sections, and two diametrically opposed hinged pairs of sections to complete the drum annulus, means to collapse the key sections diametrically toward each other, said key sections, when in collapsed position, together with their collapsing means, being movable axially of said supporting shaft from the plane of the drum annulus and links individually connecting the remaining sections and each of the hinges of said sections to said supporting shaft, said hinge links being operable, upon rotation of said remaining sections relative to the supporting shaft, to move said hinged pairs of sections bodily toward each other, said section links simultaneously operating to swing the sections of each pair inwardly about their hinges to complete the collapse of the drum.

3. In a collapsible annular tire building drum, a supporting shaft therefor, a pair of diametrically opposed key sections, and two diametrically opposed hinged pairs of sections to complete the drum annulus, means to collapse the key sections diametrically toward each other, said key sections, when in collapsed position, together with their collapsing means, being movable axially of said supporting shaft from the plane of the drum annulus, and links individually connecting the remaining sections and each of the hinges of said sections to said supporting shaft, said hinge links being operable, upon rotation of said remaining sections relative to the supporting shaft, to move said hinged pairs of sections bodily toward each other, said section links simultaneously operating to swing the sections of each pair inwardly about their hinges and being of such length as to interleave the hinged sections when in collapsed position.

4. In a collapsible annular tire building drum, a supporting shaft, a hub rotatably mounted thereon, two diametrically extending arms carried by said hub, a hinge pin mounted for radial movement in each of said arms, a pair of drum sections hinged to each of said pins, links individually connecting said sections and said pins to the supporting shaft, and key sections adapted to be positioned between the free ends of said hinged sections to complete the drum annulus and prevent relative movement between said hub and the supporting shaft.

5. In a collapsible annular tire building drum, a supporting shaft, a hub rotatably mounted thereon, two diametrically extending arms carried by said hub, a hinge pin mounted for radial movement in each of said arms, a pair of drum sections hinged to each of said pins, links individually connecting said sections and said pins to the supporting shaft, key sections adapted to be positioned between the free ends of said hinged sections to complete the drum annulus and prevent relative movement between said hub and the supporting shaft and means to simultaneously collapse said key sections radially toward each other to permit collapse of the remaining sections, said key sections when in collapsed position being bodily movable from the plane of the drum annulus.

6. In a collapsible annular tire building drum, a supporting shaft, a hub rotatably mounted thereon, two diametrically extending arms carried by said hub, a pair of hinged drum sections carried by each arm, a U-shaped member adapted to be axially telescoped over said hub, key sections carried by the arms of said member adapted to be positioned between the free ends of said hinged sections to complete the drum annulus, and means to move said key sections radially toward and from said U-shaped member.

7. In a collapsible annular tire building drum, two diametrically opposed hinged pairs of drum sections, means to bodily move each pair of sections radially toward and from each other, means to swing the sections of each pair inwardly about their hinges and two diametrically opposed radially movable key sections adapted to be positioned between the free ends of the hinged sections to complete the drum annulus.

8. A collapsible annular tire building drum having an annular substantially flat central portion and separable annular edge portions supported by the central portion, said central portion comprising a plurality of sections collapsible inwardly free of the annular edge portions.

9. A collapsible annular tire building drum having an annular substantially flat central portion and separable, outwardly and and radially inwardly curving annular shoulder portions keyed for support to the central portion and terminating in bead supporting edge portions, said central portion comprising a plurality of sections collapsible inwardly free of the annular shoulder portions.

10. A collapsible annular tire building drum having an annular substantially flat central portion and separable, outwardly and radially inwardly curving annular edge portions, said central portion comprising a plurality of sections collapsible inwardly free of the annular shoulder portions, said shoulder portions comprising a plurality of collapsible sections.

11. A collapsible annular tire building drum having an annular central portion and separable annular edge portions, said portions being collapsible independently of each other.

12. In a collapsible annular tire building drum, a pair of diametrically opposed key sections, and two diametrically opposed hinged pairs of sections to complete the drum annulus, said key sections being collapsible diametrically towards each other, and movable axially, when in collapsed position, from the plane of the drum annulus, said hinged pairs of sections being movable bodily toward each other, and the sections of each pair foldable toward each other about their hinges.

In testimony whereof I have affixed my signature.

ALBERT J. DEXTER.